(12) United States Patent
Frohnmayer

(10) Patent No.: US 10,513,303 B2
(45) Date of Patent: *Dec. 24, 2019

(54) NARROW ULTRA EFFICIENT THREE WHEELED VEHICLE WITH AUTOMOTIVE CLASS FEEL

(71) Applicant: ARCIMOTO, INC., Eugene, OR (US)

(72) Inventor: Mark Douglas Frohnmayer, Eugene, OR (US)

(73) Assignee: ARCIMOTO, INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,508

(22) Filed: Jun. 11, 2018

(65) Prior Publication Data
US 2019/0135366 A1  May 9, 2019

Related U.S. Application Data

(63) Continuation of application No. 15/714,377, filed on Sep. 25, 2017, now Pat. No. 9,994,276, which is a
(Continued)

(51) Int. Cl.
| | |
|---|---|
| *B62K 5/05* | (2013.01) |
| *B62K 5/027* | (2013.01) |
| *B62K 5/08* | (2006.01) |
| *B60K 1/00* | (2006.01) |
| *B60K 1/04* | (2019.01) |

(Continued)

(52) U.S. Cl.
CPC ............. *B62K 5/027* (2013.01); *B60K 1/00* (2013.01); *B60K 1/02* (2013.01); *B60K 1/04* (2013.01); *B60K 7/0007* (2013.01); *B62J 27/00* (2013.01); *B62K 5/05* (2013.01); *B62K 5/08* (2013.01); *B62K 19/40* (2013.01); *B60K 2001/001* (2013.01); *B60K 2001/0422* (2013.01); *B60K 2001/0433* (2013.01); *B60K 2007/0046* (2013.01); *B60K 2007/0061* (2013.01); *B60Y 2200/112* (2013.01); *B60Y 2200/122* (2013.01); *B62J 2017/086* (2013.01);
(Continued)

(58) Field of Classification Search
CPC . B62K 5/027; B62K 5/05; B62K 5/08; B62M 7/00; B62M 7/06; B60K 1/04; B60K 2001/0422; B60K 2001/0433
See application file for complete search history.

(56) References Cited

U.S. PATENT DOCUMENTS 5,248,011 A * 9/1993 Richards ............... B60G 3/01
                                                   180/215
5,343,973 A * 9/1994 Lanker .................. B60K 1/00
                                                   180/211

(Continued)

*Primary Examiner* — James A English
(74) *Attorney, Agent, or Firm* — Allegman Hall Creasman & Tuttle LLP

(57) ABSTRACT

An electric three wheeled vehicle includes a vehicle chassis supporting a vehicle operator seat or saddle. The vehicle chassis defines a storage region beneath the vehicle operator seat or saddle. One or more energy storage devices for powering one or more electric motors of the vehicle are located within the storage region and are supported by the chassis. The storage region and/or the energy storage device(s) each form an elongate three-dimensional volume having a long axis that is parallel to a longitudinal axis of the vehicle.

5 Claims, 5 Drawing Sheets

Related U.S. Application Data continuation of application No. 15/188,061, filed on Jun. 21, 2016, now Pat. No. 9,783,257, which is a continuation-in-part of application No. 14/985,683, filed on Dec. 31, 2015, now abandoned.

(60) Provisional application No. 62/330,962, filed on May 3, 2016, provisional application No. 62/099,068, filed on Dec. 31, 2014.

(51) Int. Cl.
  *B60K 7/00* (2006.01)
  *B62J 27/00* (2006.01)
  *B62K 19/40* (2006.01)
  *B60K 1/02* (2006.01)

(52) U.S. Cl.
  CPC ...... *B62K 2202/00* (2013.01); *B62K 2204/00* (2013.01); *B62K 2208/00* (2013.01)

(56) References Cited

U.S. PATENT DOCUMENTS

| | | | |
|---|---|---|---|
| 2005/0224265 A1* | 10/2005 | Mizuno | B60K 1/02 429/413 |
| 2008/0006465 A1* | 1/2008 | Xie | B62D 11/24 180/252 |
| 2008/0238140 A1* | 10/2008 | Kejha | B60K 6/46 296/181.1 |
| 2012/0037441 A1* | 2/2012 | Frohnmayer | B62D 21/08 180/210 |
| 2012/0181765 A1* | 7/2012 | Hill | B62K 5/027 280/62 |
| 2013/0284528 A1* | 10/2013 | Kawasaki | B60K 7/0007 180/60 |
| 2014/0262578 A1* | 9/2014 | Calley | B62D 61/065 180/210 |
| 2014/0305728 A1* | 10/2014 | Jezequel | B62D 31/003 180/215 |
| 2016/0176457 A1* | 6/2016 | de Haan | B60N 2/90 180/215 |

* cited by examiner

NARROW ULTRA EFFICIENT THREE WHEELED VEHICLE WITH AUTOMOTIVE CLASS FEEL

CROSS-REFERENCE TO RELATED APPLICATIONS

The present application is a continuation application that claims the benefit of and priority to U.S. patent application Ser. No. 15/714,377, titled NARROW ULTRA EFFICIENT THREE WHEELED VEHICLE WITH AUTOMOTIVE CLASS FEEL, filed Sep. 25, 2017, and issuing as U.S. Pat. No. 9,994,276 on Jun. 12, 2018, which is a continuation application that claims the benefit of and priority to U.S. patent application Ser. No. 15/188,061, titled NARROW ULTRA EFFICIENT THREE WHEELED VEHICLE WITH AUTOMOTIVE CLASS FEEL AND HANDLEBAR STEERING, filed Jun. 21, 2016, and issued as U.S. Pat. No. 9,783,257 on Oct. 10, 2017, which is a continuation-in-part application that claims the benefit of and priority to U.S. patent application Ser. No. 14/985,683, titled NARROW ULTRA EFFICIENT THREE WHEELED VEHICLE WITH AUTOMOTIVE CLASS FEEL AND HANDLEBAR STEERING, filed Dec. 31, 2015, which is a non-provisional patent application that claims the benefit of and priority to U.S. provisional patent application No. 62/099,068, titled NARROW ULTRA EFFICIENT THREE WHEELED VEHICLE WITH AUTOMOTIVE CLASS FEEL AND HANDLEBAR STEERING, filed Dec. 31, 2014. The entire contents of each of these priority applications are incorporated herein by reference in their entirety for all purposes.

U.S. patent application Ser. No. 15/188,061, titled NARROW ULTRA EFFICIENT THREE WHEELED VEHICLE WITH AUTOMOTIVE CLASS FEEL AND HANDLEBAR STEERING, filed Jun. 21, 2016 is also a non-provisional application that claims the benefit of and priority to U.S. provisional patent application No. 62/330,962, titled NARROW ULTRA EFFICIENT THREE WHEELED VEHICLE WITH AUTOMOTIVE CLASS FEEL AND HANDLEBAR STEERING, filed May 3, 2016. The entire contents of this priority application are incorporated herein by reference in their entirety for all purposes.

The present application additionally incorporates herein by reference the entire contents of each of the following U.S. patent applications in their entirety for all purposes: U.S. patent application Ser. No. 14/860,502, titled VEHICLE POWERTRAIN WITH DUAL-INDEPENDENT TRANSMISSIONS, filed Sep. 21, 2015; U.S. patent application Ser. No. 14/962,929, titled BATTERY SYSTEM, filed Dec. 8, 2015; and U.S. patent application Ser. No. 14/960,289, titled BATTERY ASSEMBLY INCLUDING MULTI-ROW BATTERY INTERCONNECTION MEMBER, filed Dec. 4, 2015.

BACKGROUND

Electric vehicles are commonly powered by an electric battery or fuel cell that supplies electrical energy to one or more electric motors. Electric vehicles may take a variety of different forms, including two, three, or four wheeled vehicle platforms.

SUMMARY

An electric three wheeled vehicle includes a vehicle chassis supporting a vehicle operator seat or saddle. The vehicle chassis defines a storage region beneath the vehicle operator seat or saddle. One or more energy storage devices for powering one or more electric motors of the vehicle are located within the storage region and are supported by the chassis. The storage region and/or the energy storage device(s) each form an elongate three-dimensional volume having a long axis that is parallel to a longitudinal axis of the vehicle. A vehicle operator, when seated upon the seat or saddle, sits astride the one or more energy storage devices. A handlebar steering assembly is operatively coupled to a pair of front wheels to provide steering. The vehicle includes a single rear wheel.

DETAILED DESCRIPTION

Figure 1:
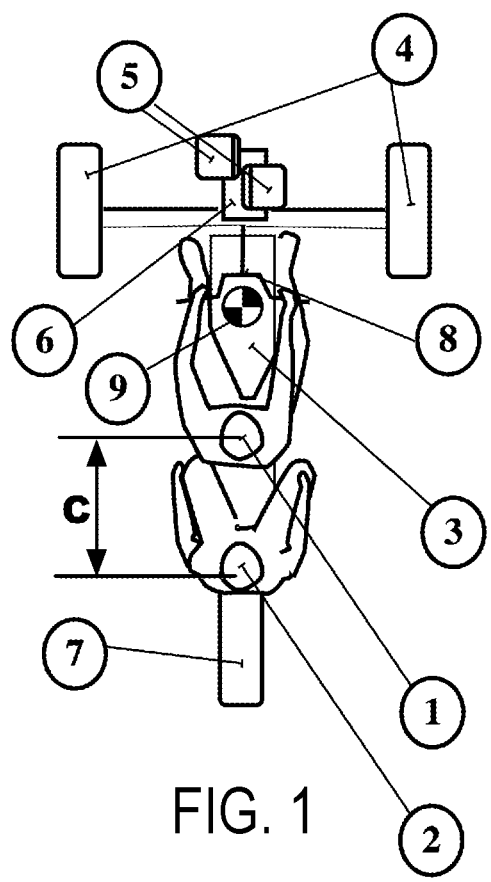
FIG. 1 is a top view of an example ultra efficient vehicle platform.

The present disclosure is directed to an ultra efficient vehicle, particularly a three wheeled electric vehicle suitable for transporting one or two occupants.

There has been increasing demand in recent years for ultra efficient vehicles that carry a lesser energy and environmental footprint than traditional automobiles. Increasing adoption of hybrid vehicles featuring increased fuel efficiency is an example of this trend. Although there is a latent market demand for additional efficiency gains brought by adopting more efficient power systems, such as a battery electric drive, or more energy efficient form factors, such as two or three wheeled vehicles, with or without a narrow body, most consumers have not chosen such offerings, as they have lacked some or all of the mass market vehicle consumer requirements: familiar feel and controls, ability to operate on all roads, capacity for a second passenger and a minimum level of reliability and perceived safety.

Further, the high population density of urban environments necessitates transportation solutions that minimize overall vehicle footprints. The recumbent, automotive-control seating position taught in Frohnmayer et. al's prior Narrow Ultra Efficient Three Wheeled Electric Vehicle with Automotive Class Feel application (issued as U.S. Pat. No. 8,985,255) utilizes a minimum vehicular footprint that is longer than the width of a typical automotive parking space—thus such vehicles cannot be parked on the roadside perpendicular to the direction of travel.

Examples in the present art include narrow body vehicles proposed for increasing transportation efficiency by carrying one or more people in tandem seating. Such vehicles have three or more wheels to keep them upright when stopped. U.S. Pat. Nos. 4,484,648, 4,283,074 and 6,328,121 disclose narrow vehicles that utilize tilting mechanisms or ballast to provide stability when turning. Although these vehicles have significant aerodynamic and maneuverability benefits due to their small stature, their ultra-narrow form factors lead to an appearance of lack of stability. U.S. Pat. Nos. 5,806,622 and 5,960,901 appear to disclose narrow three wheeled vehicles designed to carry one passenger, driven from the rear wheel. The inability to carry a second passenger and rear-drive traction concerns limit the widespread adoption of such vehicles. U.S. Pat. No. 6,328,121 appears to teach of the importance of a high rollover threshold for ultra narrow automobiles and the importance of low center of gravity in establishing a high rollover threshold. Each of these vehicles suffer from an appearance of instability, a lack of familiar feel, safety or comfort, or expansive vehicular footprint such that none has been widely adopted.

The foregoing objects are achieved by providing a vehicle platform comprised of a vehicle chassis supported by three wheels, one on each side of the vehicle mounted with their axis perpendicular to the long axis of the vehicle near the front, and one wheel centered near the rear of the vehicle, a propulsion system, handlebar steering mechanism to provide steering via the two front wheels, an operator's seat centered along and/or above the long axis of the vehicle, and optionally a second seat positioned directly to the rear of the operator's seat. The vehicle components are arranged to provide an optimal low center of gravity and good handling and drive characteristics.

In one embodiment, the propulsion system is comprised of an electric motor powered by an energy storage device and positioned near the base plane of the vehicle, coupled to a power transmission mechanism, which is mechanically coupled to the two front wheels. In this embodiment the power transmission mechanism is preferably a speed reduction and differential with dual output drive suitable for two wheel front drive.

In another embodiment, the propulsion system is comprised of a pair of electric motors, each of which is mechanically coupled to one of the two front wheels. In one embodiment these motors are capable of high torque output sufficient to power the wheels without gear reduction. In another embodiment, each motor is coupled to an intermediate gear reduction transmission mechanism interposed between the motor and the driven wheel.

In one embodiment the energy storage device is a battery system. The energy storage device is positioned near the base plane of the vehicle, and propulsion system and the power transmission mechanism are positioned forward of the energy storage device along the longitudinal axis of the vehicle. The energy storage device is arrayed such that the long axis of the energy storage device is substantially parallel to the longitudinal axis of the vehicle.

The energy storage device is preferably of a maximum width less than 14 inches such that the vehicle operator can comfortably sit astride the energy storage device. However, other suitable dimensions may be used. In a preferred embodiment the energy storage device is constrained in the z direction (i.e., vertical direction) such that the operator's center of mass is positioned as low as possible in the vehicle while maintaining a comfortable seating position.

Some advantages of the present disclosure include one or more of the following: to be significantly narrower in body and narrower in track width than a conventional automobile for improved maneuverability in heavy traffic and urban environments, easier parking and improved aerodynamic efficiency; to be shorter in length than a conventional automobile, such that the vehicle can be parked perpendicular to the curb; to have automotive class stability, feel and traction despite its narrow form and small footprint on the road; to be fast enough for freeway travel; to provide a significantly higher level of operator safety than other motorcycle class vehicles; to be less expensive to build and operate than a conventional automobile; and to be a practical and thus commercially viable alternative to conventional automobiles.

Figure 2:
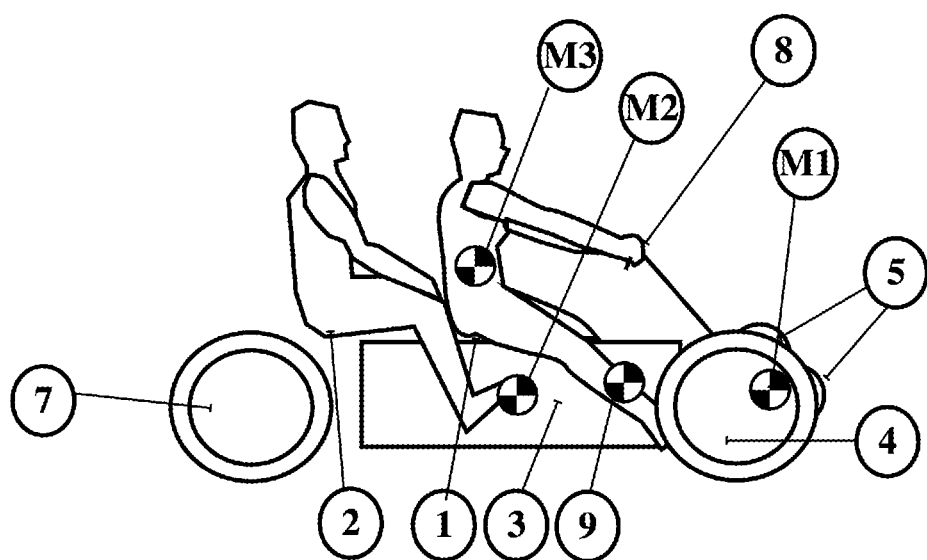
FIG. 2 is a side view of the ultra efficient vehicle platform of FIG. 1.

An embodiment of the vehicle platform is depicted in FIGS. 1 and 2 showing the common elements of the platform. The vehicle platform includes a propulsion system for providing motive power to two front wheels, an energy storage device to provide energy to the propulsion system, a single rear wheel, seats for one or two occupants, and a handlebar mechanism for steering the two front wheels. Operator seat 1 and passenger seat 2 are positioned such that the passenger seat is directly behind the operator seat. Alternatively the passenger seat may not be provided so as to add more storage capacity to the vehicle. The operator and passenger seats are positioned closer together than the front and rear seats of a conventional automobile in order to provide a smaller vehicle footprint on the road. The operator seat is positioned above the energy storage device 3 such that the operator sits astride the energy storage device.

Two front wheels 4 positioned near the front of the vehicle are driven by a propulsion system, which is preferably one or two motors 5 powered by an energy storage device 3 and connected to a power transmission mechanism 6 to distribute power to the front wheels. The energy storage device is preferably a battery. Alternatively, other suitable energy storage devices may be used, such as a fuel cell or fuel (e.g., gasoline) tank. One rear wheel 7 is positioned along the long axis near the rear of the vehicle. The components of the propulsion system are arranged so as to provide ballast for stability on the three wheeled platform; the motors center of mass M1 is positioned in front of the center of mass of the energy storage device M2, and the energy storage device is positioned low such that its center of mass M2 is below the operator center of mass M3. The use of a handlebar steering mechanism 8 allows the operator to sit closer to the two front wheels than a traditional recumbent automotive steering wheel and pedal positioning.

The high proportion of mass forward and low result in an optimally positioned center of gravity 9 which combined with drive and steering from the front wheels yield an automotive class feel to the narrow body three wheeled vehicle.

In some embodiments, the ground clearance, i.e., the distance between the bottom surface of the energy storage device 3 and ground level, is in the range of about 5 inches to about 8 inches, and is preferably approximately 6 inches.

The front seat is constructed to be narrower where it overlaps the knees of the rear seat passenger to allow the feet and knees of the rear occupant to comfortably straddle the front seat when the two seats are close together. This arrangement allows the two occupants to sit closer together than a typical automobile. In this embodiment, the couple C (longitudinal distance between the hip pivot points of the two occupants) can be reduced to a value of 28 to 21 inches while maintaining acceptable rear occupant comfort by keeping the angle H (e.g., a leg spreading angle of the rear passenger in the horizontal plane) less than 60 degrees. A typical automobile has a couple C of greater than 29 inches, by contrast.

Figure 3:
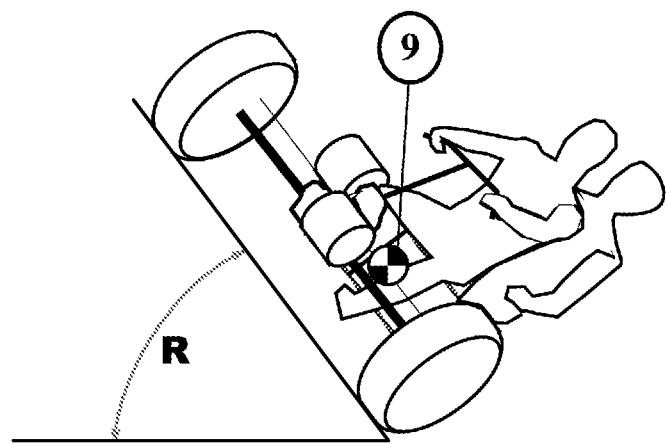
FIG. 3 is an angled front view of the vehicle platform of FIG. 1 tilted to its rollover threshold angle.

Referring to FIG. 3, the ultra efficient vehicle must have excellent stability in turns to match the experience and safety of a conventional automobile. In this vehicle, it is particularly desirable that the propulsion system is heavy enough, low enough and forward enough to move the vehicle's center of mass down and forward such that the rollover threshold R preferably exceeds 50 degrees from horizontal. That is, the present vehicle will always right itself onto its wheels as long as it is titled less than the rollover threshold. In comparison, some conventional sport utility automobiles have a rollover threshold as low as about 38 degrees.

Thus, the present vehicle relies on optimal placement of heavy components of the propulsion system and occupants on three wheels to provide stability in a narrowbody form. Unlike some of the prior art, the present vehicle does not use (or does not necessarily require use of) any device for leaning into the inside of a turn, so instead it leans to the outside of a turn like a conventional automobile. Therefore it can use standard, tested automotive components, increasing reliability and also providing familiar handling and traction to people who are accustomed to the operation of conventional automobiles.

Accordingly, an ultra efficient vehicle is provided that is significantly narrower in body and narrower in track width than a conventional automobile for improved maneuverability in heavy traffic and urban environments, easier parking and improved aerodynamic efficiency. Despite its narrow track width and lack of body tilting it is as stable as a conventional wide-body automobile. It provides familiar feel and traction to drivers accustomed to conventional automobiles despite its narrow form and three wheeled footprint on the road. This vehicle may be as fast as a conventional sedan. Its stability on the road and ability to accommodate a safety frame provide a significantly higher level of operator safety than motorcycle class vehicles. The removal of mass elements and a wheel, while potentially utilizing standard automotive transmission components cause it to be less expensive to build and operate than a conventional automobile. This vehicle is thus a practical and commercially viable alternative to conventional automobiles and motorcycles.

Figure 4:
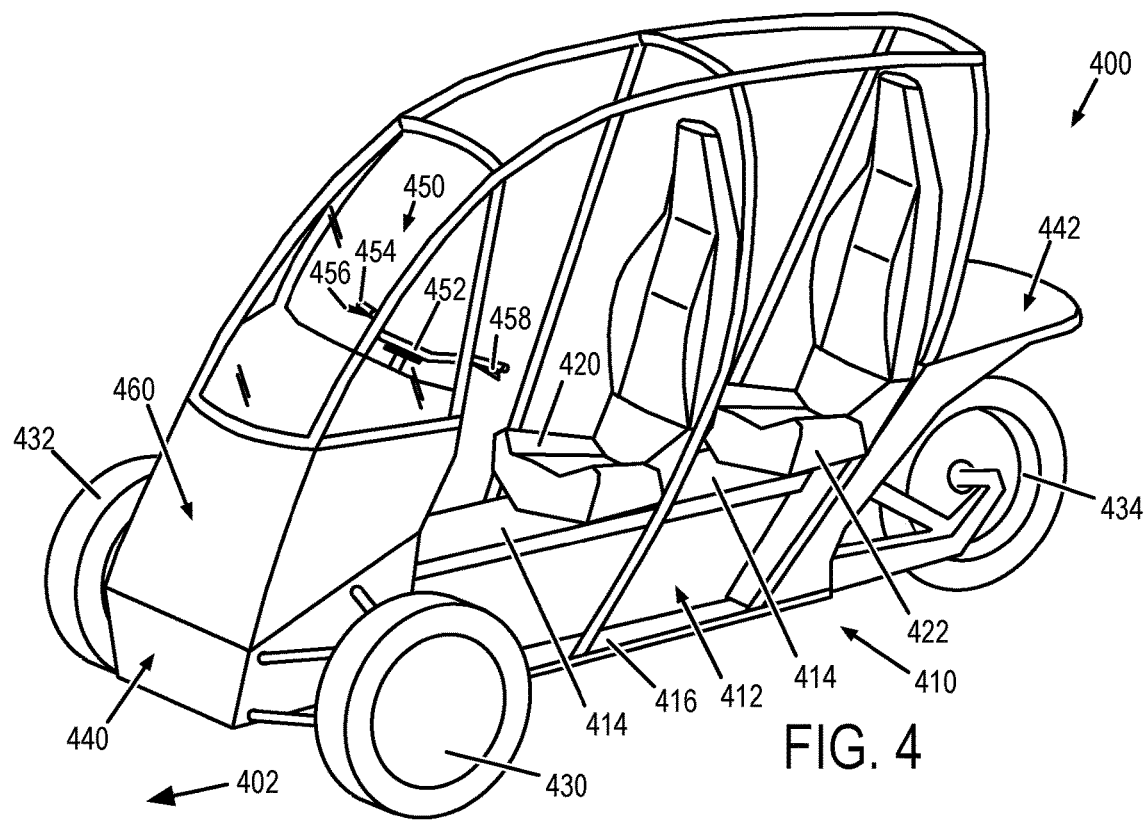
FIG. 4 depicts an external view of an example vehicle platform.

FIG. 4 depicts an external view of an example vehicle platform 400 (i.e., vehicle). Vehicle platform 400 is a non-limiting example of the previously described vehicle platform of FIGS. 1-3. Accordingly, vehicle platform 400 may take the form of an electric vehicle for one or more human passengers, as a non-limiting example. Within FIG. 4, a forward direction of travel of vehicle platform 400 is depicted in FIG. 4 by reference numeral 402 and associated vector.

Vehicle platform 400 includes a chassis 410 including and/or defining a battery storage region 412. As an example, the battery storage region forms an elongate three-dimensional volume having a long axis that is parallel to a longitudinal axis of the vehicle. In this example, the longitudinal axis of the vehicle is parallel to the forward direction of travel (402) of the vehicle and is located along a vertical symmetry plane of the vehicle that is also parallel to the forward direction of travel. Vehicle platform 400 may include one or more batteries located within battery storage region 412. Battery storage region 412 is described in further detail with reference to FIGS. 6-8.

Vehicle platform 400 further includes a first seat or saddle 420 that is supported by or upon chassis 410 above the battery storage region 412 for a first passenger to be seated astride the battery storage region of the chassis. Vehicle platform 400 may further include a second seat or saddle 422 that is also supported by chassis 410 above the battery storage region 412 for a second passenger to be seated astride the battery storage region of the chassis. The second seat or saddle is located in-line with the first seat or saddle along the longitudinal axis of the vehicle. First and second seats may be supported upon and/or located above an upper wall portion 414 of the chassis that defines a ceiling of the battery storage region. In this example, the first and second seats or saddles each include an associated seat back. In other examples, the second seat or saddle may be omitted, and/or the seat backs of either seats or saddles may be omitted.

Chassis 410 further includes a floor or rail 416 and 418 (visible in FIG. 5) located along both right and left exterior sides of the battery storage region about the long axis to support the feet of the first and second passengers. In this example, each floor or rail is located at a lower elevation than the first and second seats or saddles 420, 422 and at a lower elevation than upper wall portion 414. Example features of chassis 410 and battery storage region 412 are depicted in further detail in FIGS. 5-8.

Vehicle platform 400 includes a pair of front wheels 430, 432 mounted at and/or to a front end 440 of the chassis, including a first front wheel 430 and a second front wheel 432. Vehicle platform 400 includes a single rear wheel 434 mounted to a rear end 442 of the chassis. Rear wheel 434 is located in-line with the long axis of the elongate three-dimensional volume of the battery storage region and is located in-line with the longitudinal axis of the vehicle.

Vehicle platform 400 includes a steering assembly 450 operatively coupled to first front wheel 430 and second front wheel 432 for turning or steering the vehicle. Steering assembly 450 includes a handlebar 452 for a user to provide a steering input to the steering assembly for turning or steering the vehicle. In at least some examples, a throttle control element 454 and one or more brake control elements 456 and 458 may be mounted on the handlebar. As previously described, this configuration may be used to eliminate the use of foot pedals which may necessitate additional leg room for the vehicle operator, thereby extending a length of the vehicle.

As a non-limiting example, throttle control element 454 may take the form of a rotatable handle that provides a throttle control input to a propulsion system of the vehicle, such as a propulsion system that includes one or more electric motors depicted generally at 460. As another non-limiting example, brake control elements 456 and 458 may take the form of hand activated levers mounted to the right and left handles of the handlebar that provide braking control inputs to a braking system of the vehicle, such as a braking system that includes brakes at wheels 430, 432, and/or 434.

Figure 5:
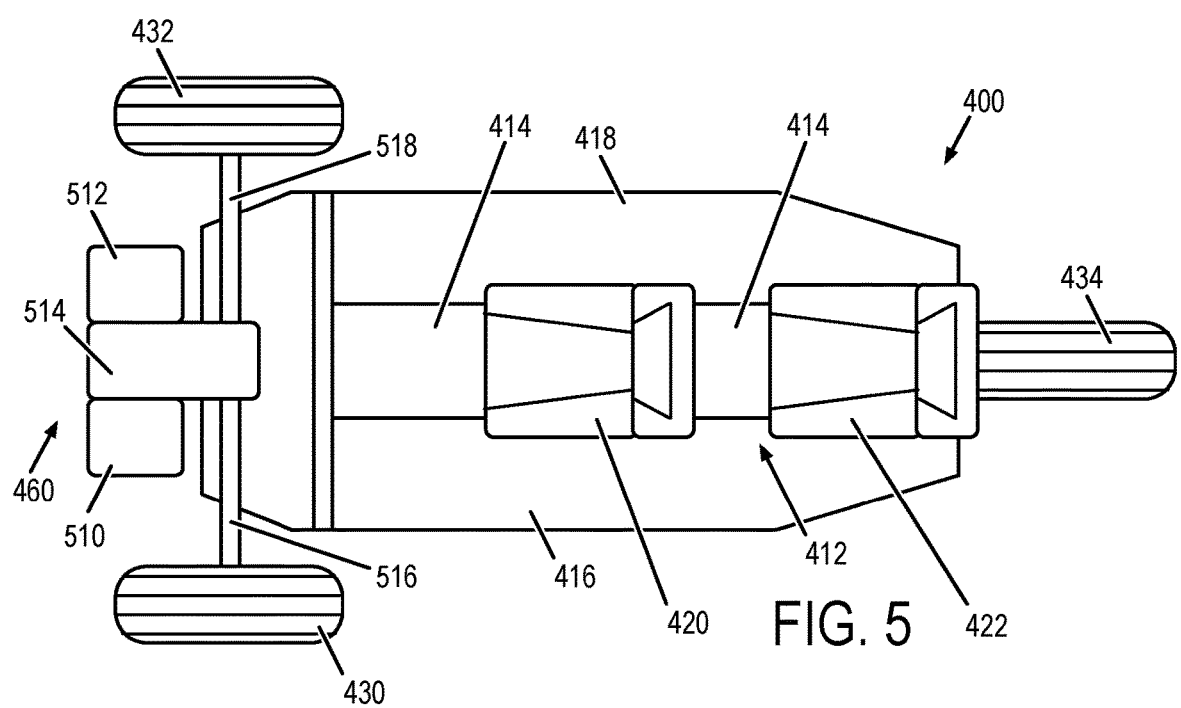
FIG. 5 depicts an above view of the vehicle platform of FIG. 4

FIG. 5 depicts an above view of vehicle platform 400 with body panels and structural members removed to reveal additional components. Propulsion system 460 may include one or more electric motors that are powered by batteries or other suitable energy storage system contained within battery storage region 412. In this example, vehicle platform 400 includes a first electric motor 510 mounted on the chassis and operatively coupled to first front wheel 430. Propulsion system 460 may further include a second electric motor 512 mounted on the chassis and operatively coupled to second front wheel 432.

As a non-limiting example, vehicle platform 400 may include a powertrain formed by a transmission 514 and axles 516, 518 that operatively couple the one or more electric motors to wheels 430 and 432. In this example, transmission 514 is a dual independent transmission that independently couples electric motor 510 to wheel 430 via axle 516, and independently couples electric motor 512 to wheel 432 via axle 518. In another example, transmission 514 may independently couple electric motor 510 to wheel 432 via axle, and independently couple electric motor 512 to wheel 430. In yet another example, propulsion system 460 may include a single electric motor that is operatively coupled to both of wheels 430 and 432 via transmission 514 and axles 516, 518. In still further examples, electric motors 510 and 512 may be replaced by another suitable propulsion system.

Non-limiting examples of transmissions for transmission 514 and electric motor configurations are described in further detail by U.S. patent application Ser. No. 14/860,502, titled VEHICLE POWERTRAIN WITH DUAL-INDEPENDENT TRANSMISSIONS, filed Sep. 21, 2015. The entire contents of this patent application and its publication are incorporated herein by reference in their entirety for all purposes. However, it will be appreciated that other suitable transmission and/or propulsion system components and configurations may be used.

FIG. 5 further provides a view of vehicle platform 400 with battery storage region 412 and the one or more batteries located therein being located on a rear side of the pair of front wheels 430 and 432, and between the single rear wheel 434 and the pair of front wheels along the longitudinal axis of the vehicle. As such, the mass of the battery storage region and batteries contained there is located between the front and rear wheels, and along the vertical symmetry plane of the vehicle. First and second electric motors 510 and 512 are located on a front side of the pair of front wheels 530, 432 opposite battery storage region 412 and the one or more batteries contained therein. As such, the mass of the electric motors is located in front of the front wheels in relation to the forward direction of travel of the vehicle.

Figure 6:
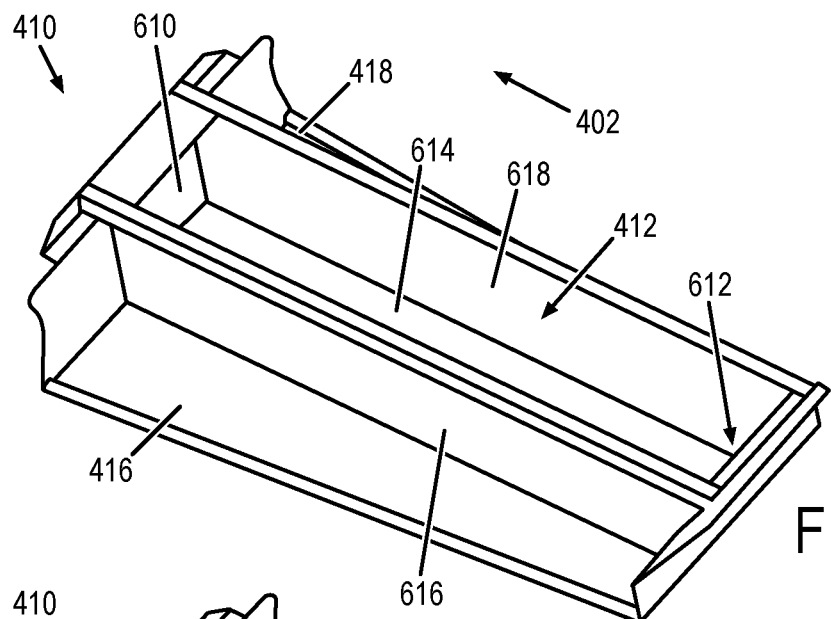
FIGS. 6-8 depict additional aspects of the vehicle chassis and battery storage region.
Figure 7:
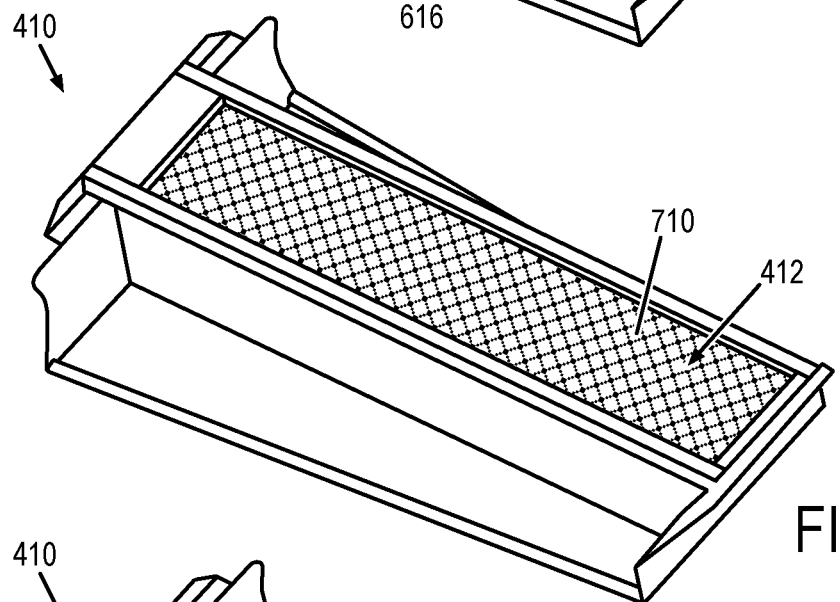
Figure 8:
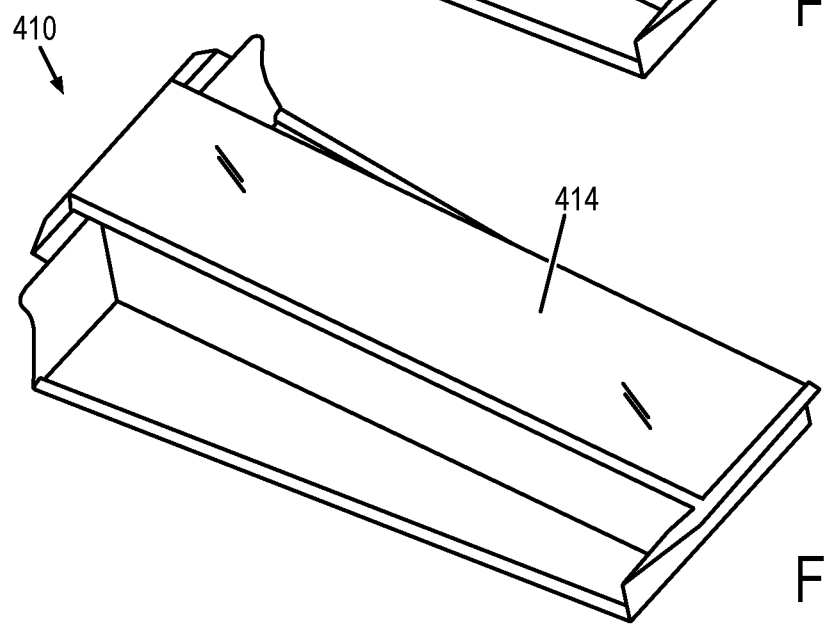

FIGS. 6-8 depict additional aspects of chassis 410 and battery storage region 412. FIG. 6 provides a view of chassis 410 with upper wall portion 414 removed and without batteries contained within battery storage region 412. Chassis 410 includes front wall portion 610, rear wall portion 612, side wall portion 616, side wall portion 618, and lower wall portion 614 that collectively define battery storage region 412 in combination with upper wall portion 414. FIGS. 6-8 further depict floor 416 and 418 in further detail.

FIG. 7 depicts chassis 410 and battery storage region 412 including a battery system 710 having one or more batteries. In an example, battery system 710 includes multiple rows of cylindrical batteries orientated in an upright configuration. Non-limiting examples of battery systems for battery system 710 and example battery configurations are described in further detail by U.S. patent application Ser. No. 14/962,929, titled BATTERY SYSTEM, filed Dec. 8, 2015, and by U.S. patent application Ser. No. 14/960,289, titled BATTERY ASSEMBLY INCLUDING MULTI-ROW BATTERY INTERCONNECTION MEMBER, filed Dec. 4, 2015. The entire contents of each of these patent applications and their publications are incorporated herein by reference in their entirety for all purposes. However, it will be appreciated that other suitable energy storage devices may be used.

FIG. 8 depicts chassis 410 with upper wall portion 414 installed to enclose battery storage region 412 and battery system 710 contained therein. Within FIG. 8, the seats or saddles have been removed to provide an unobstructed view of upper wall portion 414 about which a vehicle operator and/or passenger may sit astride. It will be understood that in some examples, discrete seats or saddles may be omitted or instead integrated with upper wall portion 414 to provide a continuous saddle upon which a vehicle operator and/or passenger may sit astride.

As a non-limiting example, the internal dimensions of battery storage region 412 may be approximately 49.6 inches in length (as measured between internal faces of front wall portion 610 and rear wall portion 612), approximately 9.75 inches in width (as measured between internal faces of side wall portions 616 and 618), and approximately 11 inches in depth (as measured between internal faces of lower wall portion 614 and upper wall portion 414). These internal dimensions correspond to a volume of battery storage region 412 of approximately 5,320 cubic inches. These example internal dimensions of battery storage region 412 correspond to a relative ratio for length:width:depth of approximately 5.09:1.00:1.13, respectively. A width of the vehicle as measured between front wheels 430 and 432 is 55 inches, with a total outer width of 62 inches. A wheelbase of the vehicle as measured between a centerline of an axle or axis of rotation of the front and rear wheels may be approximately 78 inches. A track of the vehicle as measured between the front wheels may be approximately 55 inches. An overall length of the vehicle may be 105 inches, but may extend to 110 inches in some examples. A distance from an exterior surface of the front wall 610 of the battery enclosure relative to a centerline of an axle or axis of rotation of the front wheels as measured along a central plane or longitudinal axis of the vehicle may be approximately 6 inches. A clearance distance from an exterior surface of the bottom wall 614 of the battery enclosure to the ground surface may be approximately 6.5 inches. The weight of the vehicle with the batteries of battery system 710 may be approximately 1,023-1,100 lbs., and the weight of the vehicle without these batteries may be approximately 800 lbs. Accordingly, a ratio of vehicle weight with and without batteries may be approximately 1.28:1-1.38:1, respectively. The front to back weight distribution of the vehicle with the batteries may result in a center of gravity or center of mass that is located at a distance from the front of the vehicle that is 30% or 3/10ths (of the vehicle length) rear of the front axle line of the front wheels. The center of gravity or center of mass may be located at a height of approximately 18 inches as measured from the ground surface. The vehicle may turn within a circle having a diameter of approximately 27-30 ft. It will be understood that the various dimensions or measurement values described herein may vary by +/−5% or less in an example implementation. In another example implementation, these various dimensions may vary by +/−10% or less. In still another example implementation, these dimensions may vary by +/−20% or less.

In view of the preceding disclosure and associated drawings, in an example implementation, a vehicle for one or more human passengers includes a vehicle chassis supporting a vehicle operator seat or saddle. The vehicle chassis defines a storage region beneath the vehicle operator seat or saddle. The storage region forms an elongate three-dimensional volume having a long axis that is parallel to a longitudinal axis of the vehicle. The vehicle includes one or more energy storage devices located within the storage region. The one or more energy storage devices collectively form an elongate three-dimensional volume having a long axis that is parallel to the longitudinal axis of the vehicle. The vehicle includes a pair of front wheels mounted to a front end of the chassis, including a first front wheel and a second front wheel. The vehicle includes a single rear wheel mounted to a rear end of the chassis. The vehicle includes a handlebar steering assembly operatively coupled to the first front wheel and the second front wheel. The vehicle includes a first electric motor mounted on the chassis and operatively coupled to the first front wheel, and a second electric motor mounted on the chassis and operatively coupled to the second front wheel. The storage region and the one or more energy storage devices are located between the single rear wheel and the pair of front wheels along the longitudinal axis of the vehicle. The first and second electric motors are located on a front side of the chassis opposite the storage region and the one or more energy storage devices.

Although the above description is specific, it should not be considered as a limitation on the scope of the invention, but only as an example of one preferred embodiment. Many variations are possible within the teachings of the invention. Therefore, the scope of the invention should be determined by the amended claims and their legal equivalents, not by the examples given.

The invention claimed is:

1. An electric three wheeled vehicle, comprising:
   a chassis defining a battery storage region, the battery storage region forming an elongate three-dimensional volume having a long axis that is parallel to a longitudinal axis of the vehicle;
   a pair of steerable front wheels mounted to the chassis at or near a front end of the chassis;
   a single rear wheel mounted to the chassis at or near a rear end of the chassis along a symmetry plane of the vehicle that is parallel to the longitudinal axis of the vehicle;
   a set of one or more batteries located within the battery storage region of the chassis, a center of mass of the set of batteries being located on a rear side of an axle centerline of the front wheels;
   a rear seat supported by the chassis above the battery storage region for a rear passenger to be seated astride the battery storage region of the chassis;
   a front seat supported by the chassis above the battery storage region for a vehicle operator to be seated, the front seat being in-line with the rear seat;
   a steering assembly operatively coupled to the pair of front wheels for steering the vehicle;
   a first electric motor mounted to the chassis and operatively coupled to a first front wheel of the pair of front wheels, a center of mass of the first electric motor being located on a front side of the axle centerline of the front wheels; and
   a second electric motor mounted to the chassis and operatively coupled to a second front wheel of the pair of front wheels, a center of mass of the second electric motor being located on the front side of the axle centerline of the front wheels.

2. The electric three wheeled vehicle of claim 1, wherein the steering assembly includes a handlebar for a user to provide a steering input to the steering assembly.

3. The electric three wheeled vehicle of claim 2, further comprising:
   a throttle control element mounted on the handlebar; and
   a brake control element mounted on the handlebar.

4. The electric three wheeled vehicle of claim 1, wherein the front seat is configured for the vehicle operator to be seated astride the battery storage region of the chassis.

5. The electric three wheeled vehicle of claim 1, wherein the first electric motor is located on a first side of the symmetry plane of the vehicle, and the second electric is located on a second side of the symmetry plane of the vehicle.

* * * * *